United States Patent
Clark

(10) Patent No.: US 6,459,888 B1
(45) Date of Patent: Oct. 1, 2002

(54) METHOD OF ESTIMATING CARRIER FREQUENCY IN A DIGITAL MOBILE COMMUNICATIONS SYSTEM THROUGH MULTIPLE HYPOTHESES PERFORMED ON THE RECEIVED SIGNAL

(75) Inventor: Ricke W. Clark, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/164,534

(22) Filed: Sep. 30, 1998

(51) Int. Cl.[7] .................................................. H04B 1/06
(52) U.S. Cl. ........................ 455/266; 375/326; 375/374
(58) Field of Search ................................. 455/266, 254, 455/289; 375/326, 344, 338, 371, 226

(56) References Cited

U.S. PATENT DOCUMENTS

| | | | | |
|---|---|---|---|---|
| 5,287,388 A | * | 2/1994 | Ogura | 375/97 |
| 5,509,034 A | * | 4/1996 | Beukema | 375/344 |
| 5,598,441 A | * | 1/1997 | Kroeger | 375/344 |
| 5,732,109 A | * | 3/1998 | Takahashi | 375/326 |
| 5,870,429 A | * | 2/1999 | Moran | 375/222 |
| 6,016,328 A | * | 1/2000 | Caire | 375/272 |
| 6,058,147 A | * | 5/2000 | Eklof | 375/344 |

\* cited by examiner

*Primary Examiner*—Thanh Cong Le
*Assistant Examiner*—Nick Corsaro
(74) *Attorney, Agent, or Firm*—Howrey Simon Arnold & White, LLP

(57) ABSTRACT

A multiple-hypothesis frequency detection or demodulation system and method in a mobile communication system such as a GSM mobile telephone system includes a GSM mobile unit for demodulating the received signal by applying three hypotheses. The first hypothesis is based on the assumption that transmitted signal was received without frequency offset or phase rotation. The second hypothesis assumes a phase rotation of +a degrees on the first half of a burst and a phase rotation of −a degrees on the following half burst. Finally, the third hypothesis assumes that the data burst has a phase rotation of −a degrees on the first half burst and a phase rotation of +a degrees on the next following half burst. Any frequency offset is estimated based on a comparison of the results of the three separate demodulation attempts. Based on the frequency offset estimate, the transmitted signal may be demodulated without adjustment of the local oscillator.

27 Claims, 3 Drawing Sheets

METHOD OF ESTIMATING CARRIER FREQUENCY IN A DIGITAL MOBILE COMMUNICATIONS SYSTEM THROUGH MULTIPLE HYPOTHESES PERFORMED ON THE RECEIVED SIGNAL

BACKGROUND OF THE INVENTION (1) Field of the Invention

The present invention relates in general to mobile communication systems and particularly to high-frequency signal demodulation in a GSM telephony system.

(2) Description of Related Art

One standard for mobile communication is the Global System for Mobile communication (GSM). Each GSM network comprises a plurality of base transceiver stations or base cells that manage communication links with thousands of mobile units, typically hand-held mobile telephones. The base cells are connected to a controller that manages radio channel set-up and hand-off between base cells to facilitate roaming communication. The controller connects to a switching center, which in turn connects the call through to the local telephone network. Information is transmitted between the base station and the mobile unit by phase modulating the carrier signal so that the angle of the sine wave carrier deviates from the original angle by an amount proportional to the instantaneous value of the modulating wave. Accordingly, accurate detection of the carrier signal frequency is critical to ensuring clear and continuous reception.

Even though a mobile unit is camped on a base cell (often referred to as being attached to a serving cell), it must still monitor transmissions from neighboring cells. Specifically, as the mobile unit roams, it monitors signal strength from the serving cells and neighboring cells and must be able to demodulate transmissions from these cells to ensure continuous reception of transmitted information. If these cells are transmitting at frequencies that are each offset by ±50 Hertz relative to the target frequency and if the local oscillator of the mobile unit is offset by ±100 Hertz, the combined frequency offset could be as large as ±200 Hertz. Accordingly, the mobile unit must be able to correctly demodulate signals from a variety of transmitting base stations, each of which may be transmitting at a frequency that is offset from the expected or nominal frequency.

Further complicating the demodulation process is the fact that the mobile unit may freely move (and often at high rates of speed), so the transmitted signal may have a frequency shift due to the relative movement of the mobile unit either toward or away from the serving cell.

Reception problems become more apparent as the mobile unit roams so that distance to the serving cell and the neighboring cells rapidly changes. Indeed, if the movement is at a high rate, the Doppler effect can induce a significant frequency offset that will be manifested as lost data. For example, rapidly moving toward one cell and away from a second cell, the frequency of transmitted signals from the two cells may be offset by about ±500 Hertz. Doppler errors can then combine with the previously identified errors to give composite frequency errors up to ±700 Hertz.

One will appreciate that since frequency error is rotation of phase with respect to time, data will be lost or will require multiple attempts at transmitting the data. Frequency offset introduces demodulation errors because in GSM systems, signals are phase modulated with digital information encoded on the analog radio signal.

Thus correcting for frequency offset introduced by movement of the mobile unit and transmission at frequencies that deviate from the target frequency is critical in achieving substantially error-free demodulation of the transmitted signal. What is needed is an improved receiver unit in a mobile telephone system that is capable of correcting for a frequency offset of up to one thousand (±1000) Hertz.

SUMMARY OF THE INVENTION

The present invention relates to a multiple-hypothesis frequency detection or demodulation procedure in a mobile communication system. More particularly, the present invention determines a nominal frequency for demodulation of a received signal.

In mobile communication systems such as the Global System for Mobile communication (GSM) system, data is transmitted as a digitally encoded burst phase modulated on an analog radio carrier signal. Since it is difficult to determine the actual frequency of the carrier signal, the present invention digitizes the transmitted signal and tests multiple hypotheses to determine the carrier frequency. The results of these tests provide an accurate estimate of the carrier frequency and this estimate is used for demodulation.

Specifically, in the present invention, the GSM mobile unit receives a transmitted signal from one or more base stations. A representation of the signal is filtered, digitized and stored in memory. The mobile unit recovers the encoded data by demodulating the digital representation by applying three demodulation hypotheses to at least the first two received signal bursts. The first hypothesis is based on an assumption that the transmitted signal was received without frequency offset or phase rotation. After demodulation, the recovered data is checked to determine if any errors are present. The mobile unit demodulates the digital results a second time applying a second hypothesis that the data burst has a phase rotation of +a degrees on the first half of the burst and a phase rotation of -a degrees on the last half of the burst. The recovered data is again checked for errors. Finally, the mobile unit demodulates the digital results applying a third hypothesis that the data burst has a phase rotation of -a degrees on the first half burst and a phase rotation of +a degrees on the second half burst. Again the recovered data is checked to determine if the demodulation was error free. Even though two or more hypotheses may provide recovered data that appears error free, the recovered data may differ. In such instances, the two versions of recovered data may further include a Euclidean distance measure test or other similar test to provide a basis for deciding which version of the recovered data is most correct.

An estimate of frequency offset is based on a comparison of the results of the three separate demodulation attempts. For example, if the demodulation attempts all agree, the signal was received with substantially no frequency offset. However, if either the second or third hypotheses properly recover the data while the first hypothesis generated errors, frequency offset approaches the selected frequency as used in the respective demodulation attempt. In this manner a substantially accurate estimate of the frequency offset is obtained in real time with little compute overhead and without any a priori frequency offset estimate. Based on the frequency offset estimate, the transmitted signal may be demodulated without adjustment of the mobile unit's local oscillator.

DETAILED DESCRIPTION OF THE INVENTION

Figure 1:
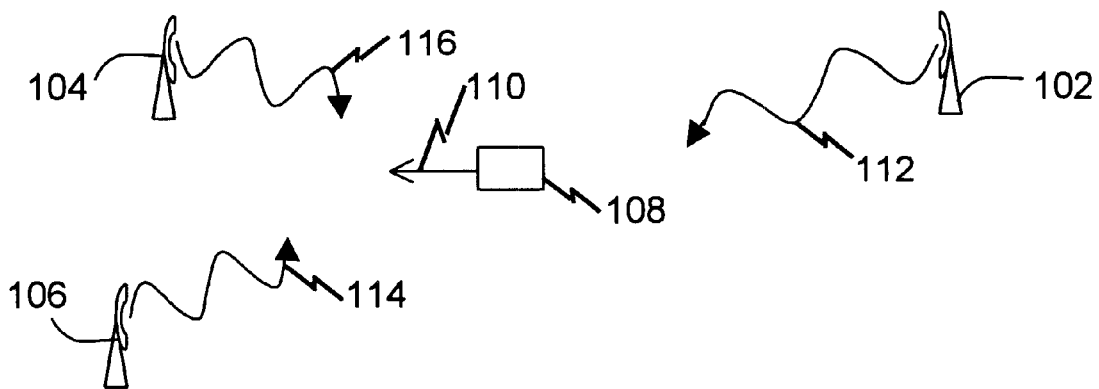
FIG. 1 shows a GSM communication system in schematic form.

In the following description of the preferred embodiment, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with a GSM telephone system. However, it is contemplated that the present invention can be used in other time domain multiple access ("TDMA") mobile communication applications.

Reference will now be made in detail to the preferred embodiments of the invention, examples of which are illustrated in the accompanying drawings. Wherever possible, the same reference numbers will be used throughout in the drawings to refer to the same or like components.

Referring to FIG. 1, a GSM communication system is shown in schematic form. The system comprises base stations, 102, 104 and 106 and a mobile unit 108. At any one time, any of base stations 102–106 could be a serving cell but for purposes of illustration base station 102 is a serving cell through which a connection to the telephone system (not shown) has been established. Stations 104 and 106 are deemed to be neighboring cells to which the connection may be transferred as mobile unit 108 roams from one cell territory to another. Mobile unit 108 is shown moving away from the serving cell (base station 102) and toward the neighboring cells as represented by arrow 110. Transmitted signal 112, as broadcast by base station 102, will have a nominal transmission frequency. However, because of the motion of mobile unit 108, the observed frequency at mobile unit 108 will be less than the broadcast frequency due to the Doppler effect. Base stations 104 and 106 also broadcast signals 114 and 116 that are received by mobile unit 108. These signals are transmitted on the synchronization channel (SCH) and are used for control purposes and in determining reference phase of the transmitted signal. These SCH signals are useful in transferring transmission to another serving cell (such as, by way of example, base station 106) as the mobile unit 108 moves outside the transmission range of base station 102.

Since mobile unit 108 is moving generally toward base stations 104 and 106, the Doppler effect will shift the observed frequencies so that each signal is generally received at higher frequency. Specifically, as mobile unit 108 moves toward base station 106, and away from base station 102, the Doppler shift may generate a frequency offset that may be as high as about 500 Hertz. This offset comprises a Doppler shift of about a −250 Hertz on the signal transmitted from base station 102 and about a +250 Hertz Doppler shift on the signal transmitted from base station 106. Further, if the frequency of base stations 102–106 is mis-adjusted or has drifted in opposite directions relative to a nominal target frequency, a combined frequency offset of up to 100 Hertz may be cumulative with the Doppler shift. Further still, if the local oscillator of mobile unit 108 deviates from its nominal target frequency, an additional frequency offset of about ±100 Hertz may be present in the communication system thereby creating a cumulative frequency offset of about ±700 Hertz. In other embodiments, the cumulative frequency offset may be greater or less than described herein but one skilled in the art will appreciate that the principals of the present invention may be readily applied to compensate for such greater or lessor frequency offset.

Figure 2:
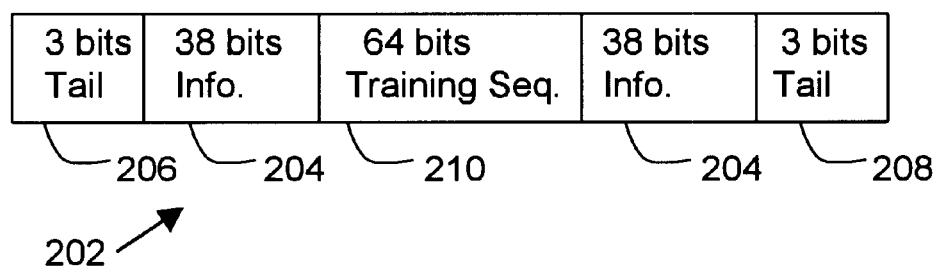
FIG. 2 illustrates one burst of data in a GSM system.

Refer now to FIG. 2. In mobile communication systems data is transmitted in a plurality of data bursts. Each data burst 202 is about 525 microseconds in duration in a GSM system during which it is possible to transmit about 146 bits of information. In GSM systems, each data burst contains two 38-bit packets 204 with the initial packet preceded by a three-bit preamble 206. A three-bit post-amble 208 follows the second of packets 204. Packets 204 include ten (10) parity bits to facilitate detection of transmission errors through simple parity checks or CRC checks.

The parity bits are defined in such a way that in GF(2) (Goppa codes) the binary polynomial:

$$d(0)D^{34}+ \ldots d(24)D^{10}+p(0)D^9+ \ldots +p(9)$$

is divided by:

$$D^{10}+D^8+D^6+D^4+D^2+1.$$

To yield a remainder equal to $$D^9+D^8+D^7+D^6+D^5+D^4+D^3+D^2+D +1$$

The encoded bits $\{u(0), \ldots u(38)\}$ are:

$u(k)=d(k)$ for $k=0,1, \ldots 24$ $u(k)=p(k-25)$ for $k=25, \ldots 34$ $u(k)=0$ for $k=33, \ldots , 38$ (tail bits)

The error bits $\{e(0), e(1), \ldots e(77)\}$ are obtained by the convolutional code:

$G(0)=1+D^3+D^4$ $G(1)=1+D+D^3+D^4$ and with $e(2k)=u(k)+u(k-3)+u(k-4)$ $e(2k+1)=u(k)+u(k-1)+u(k-3)+u(k-4)$ for $k=0, \ldots 38$ e(k) are the bits on data burst 202.

After data burst 202 is decoded, the parity bits p(k) are checked. These parity bits will be used as CRC check bits to determine frequency offset in a manner described below. It being understood that in some simple applications, it may be possible to merely perform a parity check.

Separating packets 204 is a 64-bit mid-amble 210 a modulated (e.g. by phase, or by frequency) signal comprising a known bit pattern useful as a training sequence to synchronize transmission correlating the mid-amble 210 with its known bit pattern produces a peak that, when located, defines bit positions for ambles 206 and 208 and information packets 204. More specifically, in GSM systems, phase reference is established with respect to the middle of the burst so it is necessary to find the middle of the data burst 202 after it has been digitized and stored into memory. Finding the middle is determined by correlating mid-amble 210 against a known signal template to find a burst peak. One method for finding the peak of data burst 202 is described in greater detail in the co-pending United States patent application entitled IMPROVED TIMING ESTIMATION IN MOBILE COMMUNICATION SYSTEMS USING PARABOLIC INTERPOLATOR, Ser. No. 09/163640, filed on Sep. 30 1998, the disclosure of which is incorporated herein by reference.

Once the correlation is complete, the phase of the midamble provides the phase of the entire burst and thereby synchronizes the demodulator with the signal for recovery of the encoded bits u(k). Specifically, since the SCH burst is about 525 microseconds in duration and since there are about 142 bits of information, the difference in phase angle between the beginning and the end of the burst will be:

$$360°*(525 \mu s/1 \text{ MHz})*F.O.$$

where F.O. is the frequency offset in Hertz. For a GSM system the overall phase angle will be about 0.19* F.O. degrees. Since the data burst is demodulated from middle to the front and from the middle to the end, the difference angle between the beginning of the burst and the middle of the burst will be the frequency offset divided by about 10° (that is, F.O./10°). Accordingly, for a 500 Hertz frequency offset, the angle difference between the beginning (or the end) of the burst and the middle of the burst will be about 50°. This angle is referred to as phase rotation and will result in a phase error during the demodulation process. Further, as the frequency offset increases, so to will the phase rotation. Since the reference phase is established in the middle, and if there is a frequency offset, then a progressively increasing error in the actual phase will be present when demodulating from the middle to either end of the data burst. Such phase error will result in incorrect recovery of the encoded data bits u(k) near either end of the burst.

The present invention advantageously compensates for any frequency offset that may be generated by motion related Doppler shift, component mis-adjustment or drift. For frequency offsets of greater than 500 Hertz, the first half of the burst needs to be rotated by an angle of about 60° (1.04 radians) and the second half by about −60°. For frequency offsets of less than 500 Hertz, the first half of the burst needs to be rotated by an angle of about −60° and the second half by about 60°.

Figure 3:
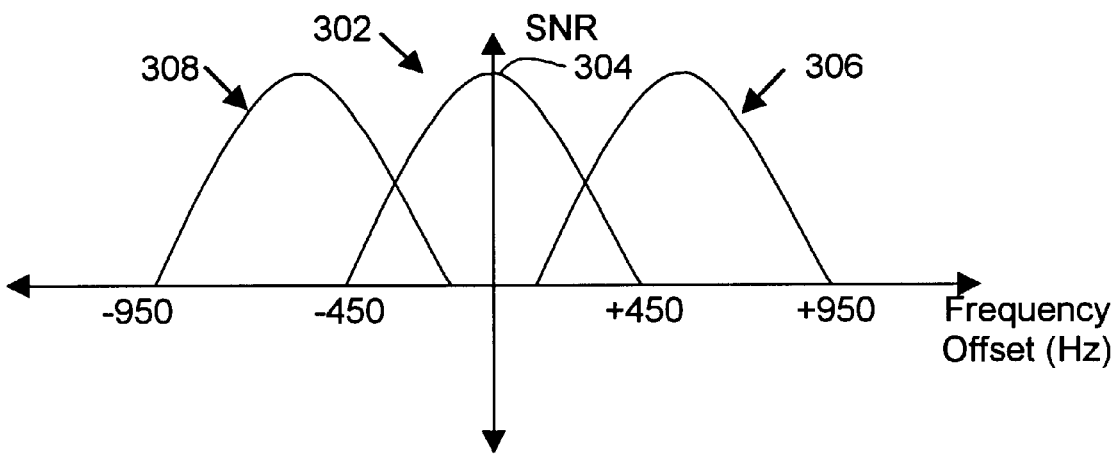
FIG. 3 illustrates a plot of signal to noise ratio (SNR) as a function of offset frequency in a GSM system.

In FIG. 3, the signal to noise ratio (SNR) as a function of offset frequency is shown at 302 for a mobile unit. One skilled in the art will appreciate that the mobile unit typically employs a single hypothesis based on the assumption that the local oscillator of mobile unit 108 is set on the nominal frequency, that mobile unit 108 is not moving and that there is no frequency offset. As shown in FIG. 3 at 304, the SNR is high so the bit error rate (BER) will be near zero. In such a scenario any transmission errors would be caused by noise and not induced by frequency offset. If the frequency of the carrier signal, however, has shifted or has an offset such as happens if there is no compensation for motion or misadjustment, the ability of mobile unit 108 to reliably detect transmitted information will begin to degrade when the observed frequency is about ±300 Hertz offset from the expected nominal.

Specifically, as the observed frequency deviates from the expected nominal however, performance will degrade manifested by increasing BER, increasing frame erasure rate, decreasing apparent SNR or all of the above. Performance will be good in the middle of SNR curve 302 but will degrade as frequency offset increases. Indeed, as the frequency offset exceeds 300 to 450 Hertz, demodulation errors will be significant and performance (that is, reception quality, lost connections, etc.) will degrade.

Figure 4:
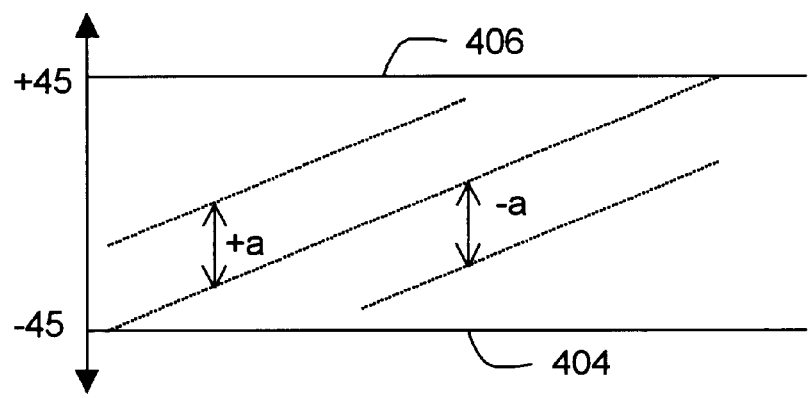
FIG. 4 illustrates a modulation index.

Since mobile unit 108 uses 90 degree phase rotation as a modulation index, a sample will be demodulated incorrectly when it crosses the 45 degree boundary as shown in FIG. 4. Indeed, starting at about 300 Hertz of frequency offset, the end bits of data burst 202 may be incorrectly demodulated and, as the frequency offset increases, the BER will increase and the data burst will be incorrectly demodulated. To demodulate with higher frequency offset, phase rotation must be substantially eliminated.

In the present invention, two additional hypotheses are made to eliminate phase rotation rather than a single hypothesis. As noted the first hypothesis assumes zero frequency offset. The second and third hypothesis assume a +500 Hertz offset and a −500 Hertz frequency offset, respectively.

More particularly, data burst 202 is demodulated using the hypothesis that the data burst was received without phase rotation. This hypothesis assumes that SNR curve 302 will provide adequate signal strength to recover the encoded data bits u(k). The parity bits (that is, u(25) to u(34)) obtained from the recovered data are checked to determine if any errors are present in the recovered data and a flag is set to indicate whether any non-recoverable errors were detected. This flag is stored in memory.

The data burst is then demodulated a second time but the hypothesis is that the data burst has a phase rotation of +a degrees on the first burst and a phase rotation of −a degrees on the next burst. As shown by SNR curve 306 to compensate for the expected frequency shift, SNR curve 306 will minimize the BER if the signal has a frequency offset at or about 500 Hertz. Accordingly, if the received signal has a positive frequency, demodulation performance will be good in the middle of SNR curve 306 but will degrade as frequency offset increases or decreases. Likewise, SNR curve 308 will minimize the BER if the signal has a frequency offset at or about −500 Hertz. The recovered data is again checked and a second flag is set to indicate whether any non-recoverable errors were detected. The second flag is also stored in memory.

Finally, the data bursts are demodulated a third time but this time a phase rotation of −a degrees is applied on the first burst and a phase rotation of +a degrees is applied to the next burst. Again the recovered data is checked to determine if the demodulation was error free and a third flag is stored to memory.

Demodulation results are checked by performing a cyclic redundancy check (CRC) or other known burst-mode checks. If two or more hypotheses provide demodulated results that pass the CRC test criteria, one skilled in the art will appreciate that the results may still differ. This happens as in the case where the CRC check provides a false positive. In such instances, the test criteria may further include an Euclidean distance measure test or other similar tests to provide a basis for deciding which sample is most correct.

In the event the check of the results indicate that the recovered data comprises an error, the respective one of the three flags, $Flag_n$, (where n=1 to 3), is set to a "one". Initially, the three flags are all set to a "zero". After decoding, the frequency offset may be estimated by comparing the results of the three demodulation attempts as summarized in Table 1.

TABLE 1

| Flag$_1$ | Flag$_2$ | Flag$_3$ | Freq. Offset Est. (Hz) |
| --- | --- | --- | --- |
| 0 | 0 | 0 | f = 0 |
| 0 | 0 | 1 | f = −450 |
| 0 | 1 | 0 | f = +450 |
| 0 | 1 | 1 | f = 0 |
| 1 | 0 | 0 | f = 0 |
| 1 | 0 | 1 | f = −250 |
| 1 | 1 | 0 | f = +250 |
| 1 | 1 | 1 | f = 0 |

In this manner a substantially accurate estimate of the frequency offset is obtained in real time with little compute overhead and without any a priori frequency offset estimate. By testing these three hypotheses on the first two bursts, mobile unit 108 reliably demodulates transmitted signals even if the signals were to include a frequency offset of about ±950 Hertz.

Figure 5:
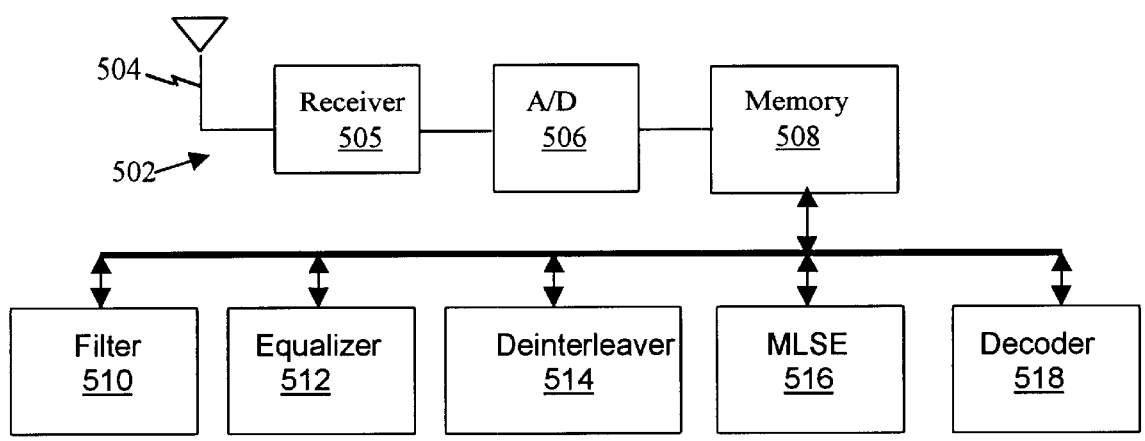
FIG. 5 is a schematic representation of a conventional GSM receiver.

Referring now to FIG. 5, a schematic representation of a conventional GSM receiver 502 is shown. Receiver 502 receives data bursts 202 from antenna 504 and converts the transmitted signal to a digitized time series signal that is stored in memory. This digitized signal is then filtered, equalized and decoded.

For example, an analog to digital converter 506 digitizes the analog radio signal and stores the results in memory 508. A matched filter 510 filters the signal to eliminate noise or other interference. An equalizer 512 compensates for gross unwanted transmission frequency, amplitude or phase characteristics. De-interleaver 514 takes the digitized signal and removes inserted components, if any.

The digitized, filtered and processed signal is passed to the maximum likelihood sequence estimator MLSE 516. MLSE 516 analyses the digitized waveform and determines what sequence of 1s and 0s was most likely to have been sent to provide the observed signal. MLSE 516 is used primarily in partial response systems where there is an intentional amount of inter-symbol interference introduced to conserve band-width. As one skilled in the art will appreciate, bit information comprises information from multiple bits in each symbol that is sent. Most of the information is from the current bit but there may be additional information that may be obtained from adjacent bits. In order to optimally detect a waveform, MLSE 516 must be able to constructively combine the information not just from the current bit but from bits preceding and following the current bit. MLSE 516 takes a portion of the waveform, for example, four or five symbols and tries to reconstruct the data most likely to have created the received waveform. MLSE 516 is also used to combat multi-path in the transmission channel. Multi-path arises when a base station signal is reflected and multiple copies of the signal arrive at the mobile unit slightly displaced in time relative to the directly transmitted signal.

Finally, decoder 518 analyzes data as it implements the multiple hypotheses analysis. Decoder 518 may include means for performing a frequency translation of the digitized signal in memory 508. Frequency translation is obtained by multiplying each sample by e-jwt in the time domain where w is the frequency shift needed to shift the frequency by the desired angle. This multiplication step is consistent with the assumption that there was a frequency shift. Alternatively, it will be appreciated that the frequency shift may be implemented by rotating the matched filter 510 coefficients by ±a degree and stored to memory 508.

One skilled in the art will appreciate that the carrier signal is transmitted at a nominal frequency and sampled at a known rate to measure the phase. From sample to sample, the phase will change in a linear fashion at a rate determined by the ratio of the carrier frequency to the sampling rate. Accordingly, phase rotates as a linear function of time and, for each unit increment in time, the observed phase will increase by a specific amount. If the local oscillator (not shown) of mobile unit 108 is fixed, the base station is transmitting at the nominal frequency and there is no motion, there is a known phase progression and in fact the sample rate may be chosen so that the phase rotation, from sample to sample, is exactly 45 degrees, 90 degrees or some convenient number.

If two samples per symbol are to be taken and if there is a 45 degree rotation per sample, it is known then that from the middle of one sample to the middle of the next sample, there will be a phase rotation of 90 degrees. This known rotation will be built into the demodulation process so that, if there is no frequency error (everything is "on frequency") then those phases will come in at the expected values. If, however, there is a frequency error but the sampling rate does not change then as this off-frequency carrier is being sampled rather than getting the expected phase rotation, a precession of phase rotation will be observed. Thus frequency error is observable as a linear function of time and will be corrected by implementing the method and system of the present invention.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In a mobile communication system having at least one base station and at least one mobile unit where information is transmitted there-between as digitally encoded bursts modulated on an analog radio carrier signal, a method for demodulating said bursts comprising the steps of:

receiving said radio carrier signal transmitted by said base station;

digitizing said radio carrier signal;

storing said digitized radio carrier signal; and performing a multiple-hypothesis frequency detection analysis on said stored digitized radio carrier signal to estimate a frequency offset of said radio carrier signal, wherein said multiple-hypothesis frequency detection analysis step comprises the following substeps:

demodulating said digitized radio carrier signal in accordance with a plurality of phase rotation or frequency offset hypotheses to recover, for each hypothesis, the encoded information transmitted with said radio carrier signal;

performing error detection on the encoded information for each hypothesis to determine an error parameter for each of the hypotheses; and determining the frequency offset of the radio carrier signal responsive to a comparison of the error parameters for each of the hypotheses.

2. The method of claim 1 wherein said multiple-hypothesis detection analysis comprises the step of analyzing said digitized radio carrier signal in accordance with three hypotheses.

3. In a mobile communication system having at least one base station and at least one mobile unit where information is transmitted there-between as digitally encoded bursts modulated on an analog radio carrier signal, a method for demodulating said bursts comprising the steps of:

receiving said radio carrier signal transmitted by said base station;

digitizing said radio carrier signal;

storing said digitized radio carrier signal; and performing a multiple-hypothesis frequency detection analysis on said stored digitized radio carrier signal to determine the observed frequency of said radio carrier signal, wherein said multiple-hypothesis frequency detection analysis step comprises the following substeps:

demodulating the digitized radio carrier signal with a first hypothesis that the radio carrier signal was received without phase rotation;

performing a check to determine the success of said demodulation based on said first hypothesis;

storing the result of said check;

demodulating the digitized radio carrier signal with a second hypothesis that the radio carrier signal was received with a phase rotation of +a degrees on a first half burst and a phase rotation of −a degrees on a second half burst of said radio carrier signal;

performing a second check to determine the success of said demodulation based on said second hypothesis;

storing the result of said second check;

demodulating the digitized radio carrier signal with a third hypothesis that the radio carrier signal was received with a phase rotation of −a degrees on a first half burst and a phase rotation of +a degrees on a second half burst of said radio carrier signal;

performing a third check to determine the success of said demodulation based on said third hypothesis;

storing the result of said third check; and comparing the results of said checks to determine the frequency of the radio carrier signal.

4. The method of claim 3 further comprising the step of demodulating said digitized radio carrier signal in accordance with the results of said checks a) with a frequency offset of zero Hertz if all of the checks result in substantially similar results or the first check results in successful demodulation or if any two of the checks results in substantially similar results; b) with a frequency offset of a first selected frequency if said first and second checks result in successful demodulation; c) with a frequency offset of a second selected frequency if said first and third checks result in successful demodulation; d) with a frequency offset of a third selected frequency if said second check result in successful demodulation; and e) with a frequency offset of a fourth selected frequency if said third check result in successful demodulation.

5. The method of claim 4, wherein said first frequency offset is about +450 Hertz and said second frequency offset is about −450 Hertz.

6. The method of claim 4, wherein said third frequency offset is about +250 Hertz and said fourth frequency offset is about −250 Hertz.

7. The method of claim 1 wherein said performing step further comprises the step of checking demodulation results by performing a cyclic redundancy check (CRC).

8. In a mobile communication system having a digitized sample of a phase modulated analog radio carrier signal, a method of demodulating said simple comprising the steps of:

applying to the digitized sample of the modulated signal at least three phase rotation or frequency offset hypotheses, thereby demodulating the sample of the modulated signal for each of the hypotheses, and recovering data for each of the hypotheses;

performing error detection on the recovered data resulting from the previous step to determine an error parameter for each of the hypotheses; and based on a comparison of the error parameters for each hypothesis, obtaining a frequency offset estimate of said radio carrier signal.

9. The method of claim 8 wherein any frequency offset in the radio carrier signal relative to the transmission frequency is estimated based on a comparison of the results of the three separate demodulation attempts.

10. In a GSM communication system comprising a plurality of base stations and at least one mobile unit capable of receiving signals transmitted by said base stations for establishing a wireless communications connection, said mobile unit comprising:

means for receiving a modulated signal;

means for digitizing at least a portion of said signal and storing the same in a memory; and means for applying to at least a portion of the digitized modulated signal a plurality of phase rotation or frequency offset hypotheses, thereby demodulating the at least a portion of the digitized modulated signal for each of the hypotheses and recovering demodulated information for each of the hypotheses, performing error detection on the resulting demodulated information to determine an error parameter for each of the hypotheses, and, responsive to a comparison of the error parameters for each of the hypotheses, estimating a frequency offset for the digitized signal.

11. The system of claim 10 wherein said frequency translation is obtained by multiplying each sample of said at least a portion of said signal by e-jwt in the time domain where w is the frequency shift needed to shift the frequency by a predetermined amount.

12. The system of claim 10 wherein said means for digitizing, filtering and equalizing said signal comprises a matched filter.

13. The system of claim 10 wherein said frequency translation is obtained by rotating coefficients of a matched filter by ±a degrees.

14. In a mobile communication system having at least one base station and at least one mobile unit where information is transmitted there-between as digitally encoded bursts modulated on an analog radio carrier signal, a method for demodulating said bursts comprising the steps of:

receiving said radio carrier signal transmitted by said base station;

digitizing said radio carrier signal;

storing said digitized radio carrier signal; and performing a multiple-hypothesis frequency detection analysis on said stored digitized radio carrier signal to determine the observed frequency of said radio carrier signal, wherein said multiple-hypothesis frequency detection analysis step comprises the substeps of:

demodulating the digitizing radio carrier signal with a first hypothesis that the radio carrier signal was received without frequency error;

performing a check to determine the success of said demodulation based on said first hypothesis;

storing the result of said check;

demodulating the digitized radio carrier signal with a second hypothesis that the radio carrier signal was received with a frequency error of +f;

performing a second check to determine the success of said demodulation based on said second hypothesis;

storing the result of said second check;

demodulating the digitized radio carrier signal with a third hypothesis that the radio carrier signal was received with a frequency error of −f;

performing a third check to determine the success of said demodulation based on said third hypothesis;

storing the result of said third check; and comparing the results of said checks to determine the frequency of the radio carrier signal.

15. In a wireless communications device configured to receive a modulated signal comprising one or more bursts of information, a method of estimating a frequency offset of the signal comprising the following steps:

storing at least a portion of the modulated signal;

applying to the at least a portion of the modulated signal a plurality of phase or frequency hypotheses, thereby demodulating the at least a portion of the modulated signal for each of the hypothesis, and recovering demodulated information for each of the hypotheses;

performing error detection on the demodulated information to determine an error parameter for each of the hypothesis; and estimating a frequency offset of the signal responsive to the error parameters.

16. The method of claim 15 wherein the demodulating step comprises demodulating the stored one or more bursts in accordance with a plurality of phase rotation hypotheses.

17. The method of claim 15 wherein the demodulating step comprises demodulating the one or more stored bursts in accordance with a plurality of frequency offset hypotheses.

18. The method of claim 15 wherein the evaluating step comprises comparing any errors in the demodulated bursts for each of the hypotheses, and determining the frequency offset based on the comparison.

19. The method of claim 15 further comprising performing a frequency shift on one or more stored bursts using the estimated frequency offset.

20. A wireless communications device configured to receive a modulated signal comprising one or more bursts of information, the device comprising:

a memory for storing at least a portion of the modulated signal; and a decoder for applying to the at least a portion of the modulated signal a plurality of phase or frequency hypotheses, thereby demodulating the at least a portion of the modulated signal for each of the hypotheses and recovering demodulated information for each of the hypotheses, performing error detection on the demodulated information to determine an error parameter for each of the hypotheses, and, responsive thereto, estimating a frequency offset of the signal.

21. The device of claim 20 wherein the decoder demodulates the stored one or more bursts in accordance with a plurality of phase rotation hypotheses.

22. The device of claim 20 wherein the decoder demodulates the one or more stored bursts in accordance with a plurality of frequency offset hypotheses.

23. The device of claim 20 wherein the decoder compares detected errors if any in the demodulated bursts for each of the hypotheses to estimate the frequency offset.

24. The device of claim 20 wherein the decoder performs a frequency shift on one or more stored bursts using the estimated frequency offset.

25. The device of claim 20 further comprising a matched filter for filtering one or more stored bursts in accordance with the estimated frequency offset.

26. In a wireless communications device configured to receive a modulated signal, a method of estimating a frequency offset of the signal comprising:

a step for storing at least a portion of the modulated signal;

a step for applying to the at least a portion of the modulated signal a plurality of phase or frequency hypotheses, thereby demodulating the at least a portion of the modulated signal for each of the hypothesis, and recovering demodulated information for each of the hypotheses;

a step for performing error detection on the demodulated information to determine an error parameter for each of the hypotheses; and a step for estimating a frequency offset of the signal responsive to the error parameters.

27. A wireless communications device configured to receive a modulated signal comprising:

means for storing at least a portion of the modulated signal; and means for applying to the at least a portion of the modulated signal a plurality of phase or frequency hypotheses, thereby demodulating the at least a portion of the modulated signal for each of the hypotheses and recovering demodulated information for each of the hypotheses, performing error detection on the demodulated information to determine an error parameter for each of the hypotheses, and, responsive thereto, estimating a frequency offset of the signal.

* * * * *

UNITED STATES PATENT AND TRADEMARK OFFICE
Certificate

Patent No. 6,459,888 B1                                                             Patented: October 1, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ricke W. Clark, Irvine, CA (US); and Rafik Jallad, Paris (FR).

Signed and Sealed this Twenty-fourth Day of April 2012.

*NICK CORSARO*
*Supervisory Patent Examiner*
*Art Unit 2617*
*Technology Center 2600*